(No Model.)

W. McKAY.
Sheave for Pilot Wheel Shaft.

No. 231,071. Patented Aug. 10, 1880.

WITNESSES
S. E. Thomas.
H. M. Perrin

INVENTOR
William McKay
By
Wells W. Leggett. ATTORNEY

United States Patent Office.

WILLIAM McKAY, OF DETROIT, MICHIGAN.

SHEAVE FOR PILOT-WHEEL SHAFTS.

SPECIFICATION forming part of Letters Patent No. 231,071, dated August 10, 1880.

Application filed June 14, 1880. (No model.)

*To all whom it may concern:*

Be it known that I, WILLIAM McKAY, of Detroit, county of Wayne, State of Michigan, have invented a new and useful Improvement in Sheaves for Pilot-Wheel Shafts; and I declare the following to be a full, clear, and exact description of the same, such as will enable others skilled in the art to which it pertains to make and use it, reference being had to the accompanying drawings, which form a part of this specification.

My invention consists in forming a sheave in two semicircular parts, which, placed in juxtaposition upon the shaft, will form a collar, the parts being united by bolts or other suitable clamps, and the channel for the chain being made with spaces corresponding with the links of the chain.

The invention is designed more especially for the shafts of pilot-wheels, and is intended to avoid the necessity of wrapping the rope or chain around the shaft.

Figure 1:
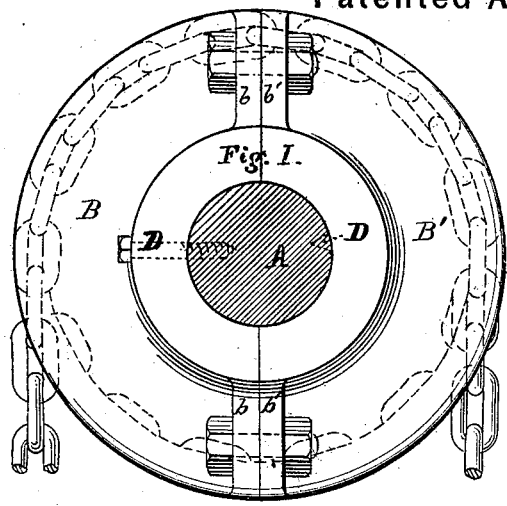
Figure 2:
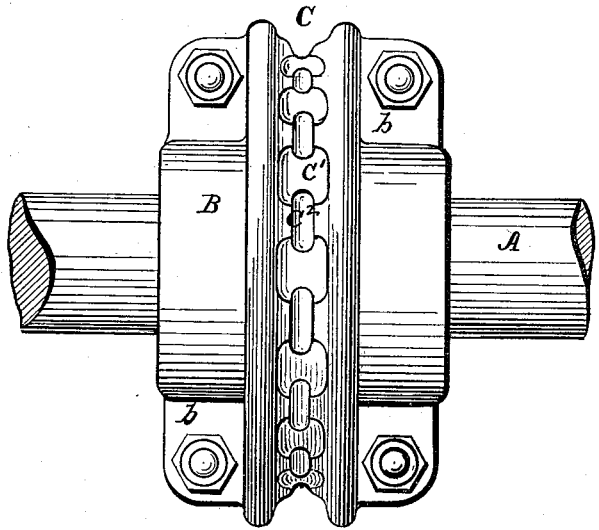

In the drawings, Figure 1 represents an end, and Fig. 2 represents a side, elevation of an apparatus embodying my invention.

Heretofore it has been customary to pass the tiller-rope or chain several times around the shaft of the pilot-wheel. This has been objectionable, however, for several reasons: First, because, in turning the wheel, the rope or chain necessarily has to travel longitudinally on the shaft, and in so doing the rope is liable to ride upon the other coils upon the shaft; and, secondly, the friction of the rope or chain upon the shaft sufficient for operating the rudder is dependent upon the rope or chain being tight upon the shaft, and as there is always more or less stretch to the rope or chain this is frequently a source of annoyance.

In carrying out my invention, A is the shaft of the pilot-wheel, or that shaft upon which the tiller rope or chain is coiled. B and B' are the two parts which constitute my improved sheave. $b$ and $b'$ are flanges, through which suitable bolts pass, clamping the parts B and B' together.

The parts B and B' are each of a semicircular form, so that they may be adjusted upon the shaft without the necessity of being slipped over the end of the shaft. They are provided with a channel, C, for the tiller-chain, and with alternately broad and narrow recesses $C'$ $C^2$, for the reception of the links of the chain, whereby the chain is prevented from slipping. One or both of the sections should be provided with a rib or edge, or a suitable screw-bolt, made to project into the shaft and prevent the sheave itself from turning upon the shaft. Such an edge and bolt are shown at D.

This device can be readily and quickly adjusted to any shaft of the proper size, and if broken can be quickly replaced. The chain is simply passed over the sheave, so as to rest upon it, and is not wrapped around the shaft. It will work just as well even if the chain is moderately loose. The traveling of the chain upon the shaft and the annoyance caused by its riding up on the other coils are obviated.

By practical use of this apparatus I find it to be very convenient, reliable, and valuable.

Of course the sheave may be made in two or more segmental pieces, and is not necessarily limited to two, and the device is equally applicable elsewhere than on pilot-wheel shafts.

What I claim is—

The sheave for tiller-shafts, &c., consisting of parts B B', a channel for the chain with link-recesses $C'$ $C^2$, flanges with bolts for fastening the parts together, and one or more ribs, edges, or bolts, D, substantially as and for the purposes described.

In testimony whereof I sign this specification in the presence of two witnesses.

WILLIAM McKAY.

Witnesses:
 WILL. M. PORTER,
 S. E. THOMAS.